United States Patent [19]

Lockwood

[11] Patent Number: 4,567,359

[45] Date of Patent: * Jan. 28, 1986

[54] AUTOMATIC INFORMATION, GOODS AND SERVICES DISPENSING SYSTEM

[76] Inventor: Lawrence B. Lockwood, 5935 Folsom Dr., La Jolla, Calif. 92037

[ * ] Notice: The portion of the term of this patent subsequent to Nov. 16, 1999 has been disclaimed.

[21] Appl. No.: 613,525

[22] Filed: May 24, 1984

[51] Int. Cl.[4] ...................... G06F 15/00; G06F 15/30
[52] U.S. Cl. ................................................. 235/381
[58] Field of Search ................. 364/200, 900; 235/381

[56] References Cited

U.S. PATENT DOCUMENTS

| | | | |
|---|---|---|---|
| 3,622,995 | 11/1971 | Clarke et al. | 340/153 |
| 4,300,040 | 11/1981 | Gould | 235/381 |
| 4,346,442 | 8/1982 | Musmanno | 364/408 |
| 4,359,631 | 11/1982 | Lockwood et al. | 235/381 |

*Primary Examiner*—Gareth D. Shaw
*Assistant Examiner*—John G. Mills
*Attorney, Agent, or Firm*—Charmasson & Holz

[57] ABSTRACT

A system for automatically dispensing information, goods and services to a customer on a self-service basis including a central data processing center in which information on services offered by various institutions in a particular industry is stored. One or more self-service information and sales terminals are remotely linked to the central data processing center and are programmed to gather information from prospective customers on goods and services desired, to transmit to customers information on the desired goods or services from the central data processing center, to take orders for goods or services from customers and transmit them for processing to the central data processing center, to accept payment, and to deliver goods or services in the form of documents to the customer when orders are completed. The central data processing center is also remotely linked to terminals of the various institutions serviced by the system, so that each institution can be kept up-dated on completed sales of services offered by that institution.

8 Claims, 7 Drawing Figures

AUTOMATIC INFORMATION, GOODS AND SERVICES DISPENSING SYSTEM

BACKGROUND OF THE INVENTION

The present invention relates to a system for automatically dispensing information, services and products to customers in a self-service fashion. Such a system may be used, for example, for automatically dispensing insurance quotations and policies.

In service-oriented industries such as the insurance industry, offices must be staffed with sales personnel working on a one-to-one basis with walk-in or phone-in customers. Often personnel time is inefficient since advice and quotations given do not result in a sale. The customer is under sales pressure, and has to visit or call various companies in order to compare coverages and prices. Thus time and energy is wasted for both the industry and the customer, increasing the cost of such services.

SUMMARY OF THE INVENTION

It is an object of the present invention to provide an automatic and efficient system for dispensing information and contractual services to the general public on a self-service basis from remote terminals.

It is a further object of the invention to provide such a system which is particularly useful for dispensing information, goods and services such as insurance quotations and policy binders agreements.

It is also an object of this invention to provide the general public information about comparable insurance coverages from several sources for comparison purposes and to automatically generate and issue insurance binder agreements according to customer's choice and specifications.

An additional object of this invention is to provide such services by means of simulated personal interview with a factitious agent created by audio-visual devices from prerecorded sound, images and synthesized data for the orderly collection of essential information.

It is another object of the invention to provide a system which reduces the overall cost of such services by lowering personnel and office overheads.

According to the present invention, an automatic system for dispensing information and goods such as printed insurance quotations and binder agreements is provided, the system comprising a data processing center and several remote satellite facilities linked to the center. The satellites are self-service sales and information terminals, each equipped with a factitious agent, plurality of data sources each corresponding to a goods or service selling company, a credit verification source and a printing device to furnish the customer with a permanent record of insurance quotations or issue of policy binders. The system carries out the following steps:

(1) Queries from a customer are accepted by the terminal;
(2) The factitious agent solicits any necessary information from the customer in order to answer the queries;
(3) Customer information and queries are transmitted to the processing center;
(4) Relevant data are retrieved from the data sources, processed and transmitted to the terminal;
(5) If the customer elects to make a credit card or debit card purchase of goods or services in response to the data received, a credit check is requested from the credit information source;
(6) On credit approval, the requested goods or services are dispensed in consideration for customer's payment by credit card or other form of payment;
(7) Information on the transaction is transmitted to the relevant company data source.

The preferred embodiment of the invention is directed to a system for automatically dispensing insurance quotations and policies. The central data processing center is linked to data sources of various insurance companies containing information on premiums and policies. The terminal is programmed to audiovisually elicit from the customer the information necessary to provide an insurance quotation from the various companies. If the customer elects to purchase any of the quoted policies, the terminal accepts the customer's credit card, initiates a credit check and, on approval, dispenses the policy.

This system saves considerable time and money both for the customer and the insurance companies. The customer does not have to personally visit or telephone several insurance companies in order to obtain quotations, and the companies do not have to provide so many sales personnel to deal with such multiple queries on a one-to-one basis. Since many of these queries do not result in sales, company time which would otherwise be wasted is saved. The insurance companies are up-dated on policies sold periodically, for example at the end of every working day.

The central data processing center is preferably linked to many self-service terminals which may be provided at convenient locations, such as banks, supermarkets, department stores, and so on.

The central data processing center stores information on the services and prices offered by each institution, and on customer sales completed by each sales and information terminal. The central data processing center is programmed to transmit periodically to each institution's data processing terminal, either directly or indirectly, for example through an automated telecommunication network service such as TELENET ®; up-dated information on sales made by the system for that institution. The center is also programmed to receive information on any changes in prices or services offered by each institution in the same way, and up-date the information stored accordingly.

Each sales and information terminal is programmed to gather a predetermined sequence of information from a customer on the services in which the customer is interested, and to transmit the information to the central data processing center. In response to the gathered information, the central data processing center extracts the desired information from its storage and transmits it back to the terminal where it is relayed to the customer.

Subsequently, the terminal is programmed to accept an order for the offered services from the customer, to collect payment and to dispense the services to the customer. The central data processing center will then up-date its stored information on completed sales.

Suitable data links, such as phone line data links, are provided between the sales and information terminals and the central data processing center. Similar data links are provided between the data processing center and the institution data processing terminals, either directly or via a telecommunication service. In the latter case each institution will have its own particular account number with the service to which information on sales made by the system will be delivered. Similarly, the system itself will have an account number to which each institution can deliver information on any changes in prices or services offered.

The central data processing center is suitably also linked to a remote credit information center for checking the credit of a customer in response to a sales order or charging customer's account via debit card.

Such a system can, for example, be used in the insurance industry. A number of automatic insurance terminals can be set up at various convenient locations such as banks, stores, or shopping malls. The terminals are all linked to the central data processing center and each include a data processor programmed to transmit preselected information to a customer and to gather predetermined customer information.

Thus a customer will be asked pertinent questions on the type of insurance desired and the information necessary to process a quotation for that particular type of insurance will be solicited. The gathered information is sent to the central data processing center, where the quotation is processed and transmitted back to the terminal. The customer is then given an opportunity to immediately select an insurance policy from one of the institutions. If an insurance policy binder is desired, a credit check is initiated, and if payment is verified the order is processed and a policy is printed out at the terminal. If the customer decides, he may take the quotation home for study and decision and return later to purchase a policy since a record of the customer's information is now on file.

A prospective insurance purchaser may receive a series of quotations from various institutions quickly and easily, without having to submit to a lengthy sales presentation. The purchaser can compare quotations at leisure, or obtain a policy on the spot if desired. The sales terminals can be far more numerous than insurance offices, at many convenient locations, and may be open round-the-clock.

The system as applied to the insurance industry is arranged to give personalized insurance quotations, make sales and take orders, collect the premiums, and forward all the information to the respective insurance company. The respective insurance company can significantly reduce paperwork and overhead costs, and have access to a wider area of the community since sales terminals can be placed in communities not usually served by a company representative.

DESCRIPTION OF THE PREFERRED EMBODIMENT

Figure 1:
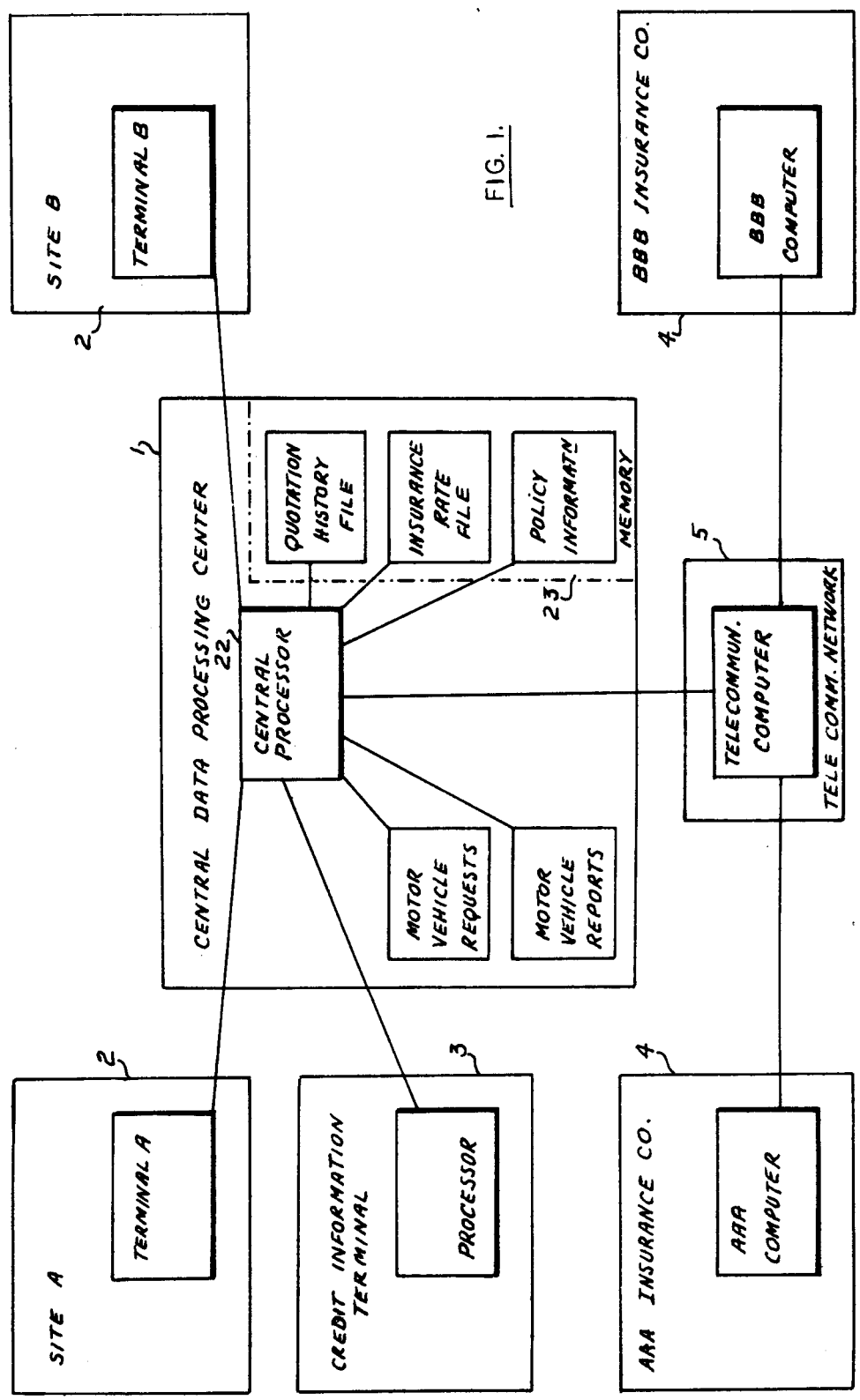
FIG. 1 is a general block diagram showing an overview of a system for automatically dispensing insurance quotations and policies according to an embodiment of the invention.

FIG. 1 shows an overview of an automatic system for dispensing insurance quotations and policies according to a preferred embodiment of the invention. It will be understood that such a system can be used in a variety of other service-oriented industries, such as the travel industry, catalogue sales industry, various financial services, and the like.

The system basically comprises a central data processing center 1 linked to various remote terminals, including one or more information and sales terminals 2, a credit information terminal 3, and data processing terminals 4 of various insurance companies served by the system. The terminals are all linked to the central data processing center by any suitable remote links, such as phone line data communication links. In the preferred embodiment of the invention the insurance companies terminals 4 are indirectly linked to the central data processing center 1 via an computorized telecommunication network service such as TELENET ®5. Each company and the system has their own specific account number with the service, which can be accessed by either the system or the company terminal to submit or retrieve information at periodic intervals.

Figure 2:
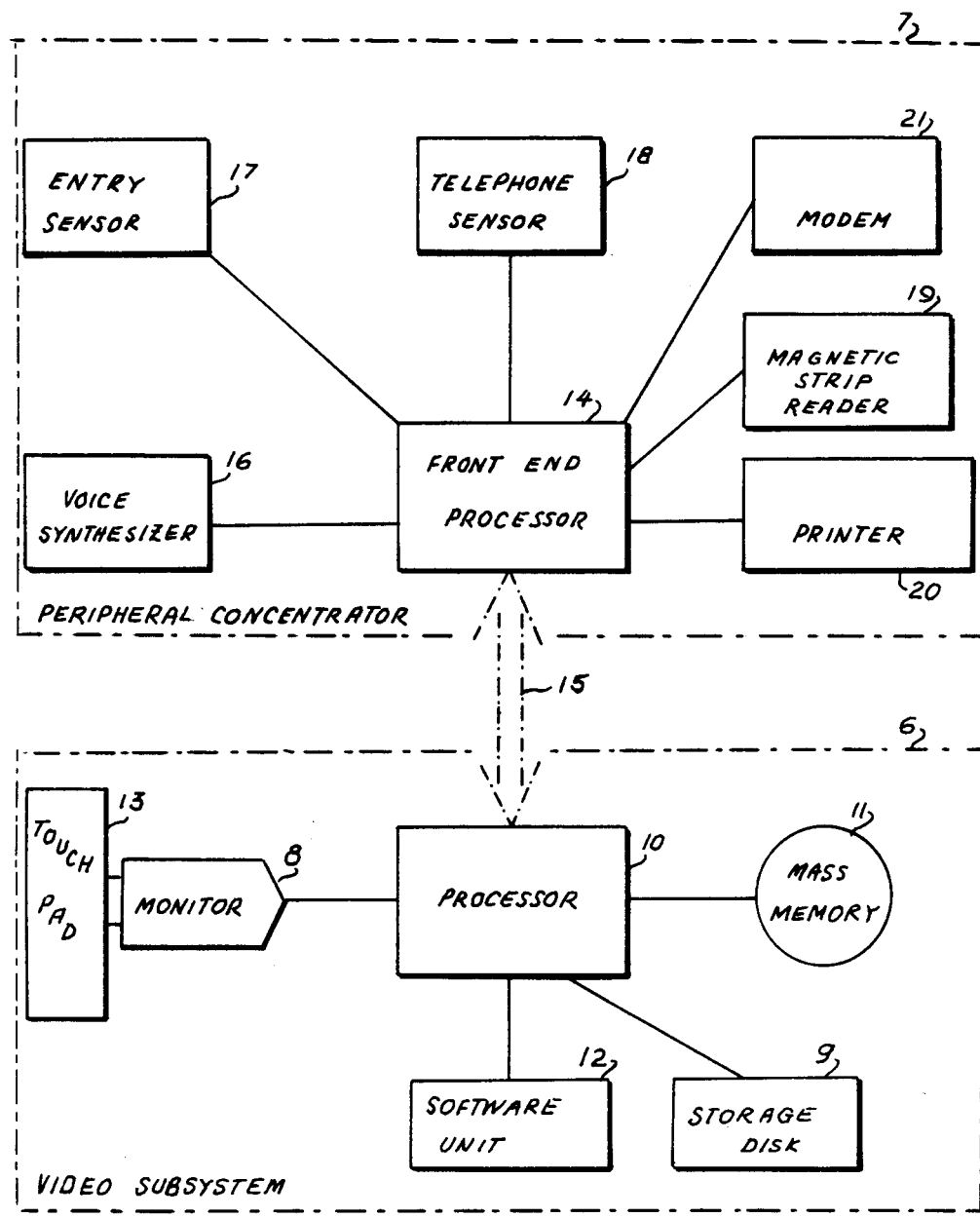
FIG. 2 is a block diagram showing an information and sales terminal of the system of FIG. 1.

In the preferred embodiment of the invention, numerous sales and information terminals 2 are provided at a series of convenient locations, such as banks, stores, shopping malls, and so on. The terminals are all remotely linked to the central data processing center. FIG. 2 is a block diagram showing various components of one such terminal.

The terminal 2 is designed to provide the same level of services as would a well-informed insurance agent and to interface with the customer by means of a factitious agent created by electronic devices; but with such a level of realism that the customer gets the impression that he is dealing with a live person.

The terminal 2 basically comprises a video subsystem 6 and a communications and peripheral concentrator subsystem 7.

The video subsystem basically comprises a video display and keyboard unit 8, a video information storage unit 9 for storing a predetermined information message, a processor unit 10 associated with a memory 11 for controlling operation of the video subsystem, and software unit 12. In one embodiment of the invention the video subsystem comprises a Digital Equipment Corp. PRO IVIS (Interactive Video Information System) and Touch System, although clearly many alternatives are available. The PRO IVIS system includes a PDP-11/23-PLUS 16 bit microprocessor, and the video storage unit 9 is a microprocessor controlled videodisc player such as the VDP40 laser videodisc player. This videodisc player can playback any standard CAV (constant angular velocity) optical videodisc. The video display and keyboard unit 8 suitably comprises a touch screen monitor such as the VR241 DEC touch color monitor or an equivalent device which displays a touch pad 13.

The communications and concentrator subsystem 7 includes a front-end processing unit 14 linked by a suitable interface 15 to the video subsystem processing unit 6, and linked to various peripheral units to co-ordinate operation of these units with the video subsystem. The peripheral units include a voice synthesizer 16, a photo-sensor device 17, a telephone sensor 18 linked to a telephone (not shown) provided in the terminal, a magnetic strip reader 19, a printer unit 20, and a modem link 21 to the central data processing center 1. In one embodiment the processing unit 14 comprises a PDP-11/23S computer or equivalent.

The front-end processing unit 14 of the communications subsystem 7 is programmed to detect the presence of a prospective customer via photo-sensor device 17. Where the terminal is set up in a booth, the sensor device will be arranged to detect a customer entering the booth. A customer detection signal is transmitted to the video subsystem 6, which operates to commence playing a pre-arranged video presentation from the videodisc player 9 over the monitor 8 and a simultaneous synchronized audio message over loudspeakers or a headphone set (not shown).

The presentation solicits and allows the customer to enter information at various points via the touch pad 13 displayed on the monitor screen. Such information is transmitted to peripheral subsystem 7, where it is generally repeated by graphics on the monitor and by voice synthesizer 16 and transmitted via modem link 21 to the central data processing center 1. The voice synthesizer 16 may suitably comprise a Digital Equipment Corp. DECTALK unit, for example.

Information received back from the central data processing center 1, for exaample insurance quotations, will be displayed and may be printed out by the processing unit 14 over the printer unit 20. The videodisc player then continues the presentation asking the customer whether or not he wishes to make a purchase. If a purchase order is entered, the customer places a credit card in the magnetic strip reader 19. The processing unit 14 is arranged to receive credit card information from the reader 19 and transmit it to the central data processing center 1. Upon receipt of credit approval an insurance policy is dispensed via the printer unit 20.

The interfacing of the various components of the terminal 2 described above is done according to standard practices well known to those skilled in the electronic arts.

The customer upon entering the booth, is then confronted with a factitious agent who appears on the video screen, solicits data, repeats answers, and gives instructions about the use of the system, and generally creates the impression of dealing with a live person.

The central data processing center 1 includes a central processing unit 22 and memory 23. The memory 23 stores program information and information on insurance policies and prices for various insurance companies, which are periodically up-dated from the terminals 4 of the various companies, and information on policy quotes and sales, which can be accessed periodically by the respective insurance company terminals. The processing unit 22 operates in response to program instructions to perform insurance quotation calculations in response to customer information received from any of the terminals, to send quotation data to the respective terminal, and to receive credit card information from a terminal and access the credit information terminal for credit approval or disapproval of a particular credit card. If a customer makes a purchase order at a particular terminal after credit is approved, the central data processing unit stores the policy information and sends instructions to the terminal to issue a policy.

Figure 3:
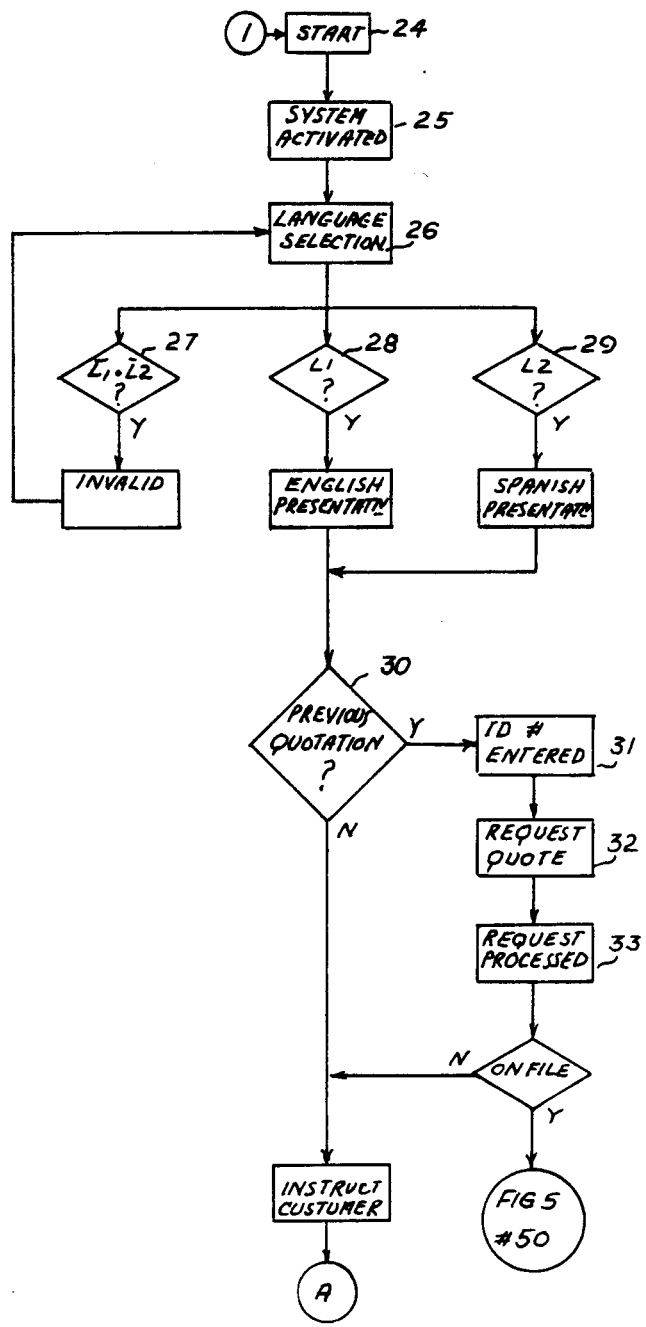
FIGS. 3 to 7 are detailed flow diagrams of the system.
Figure 4:
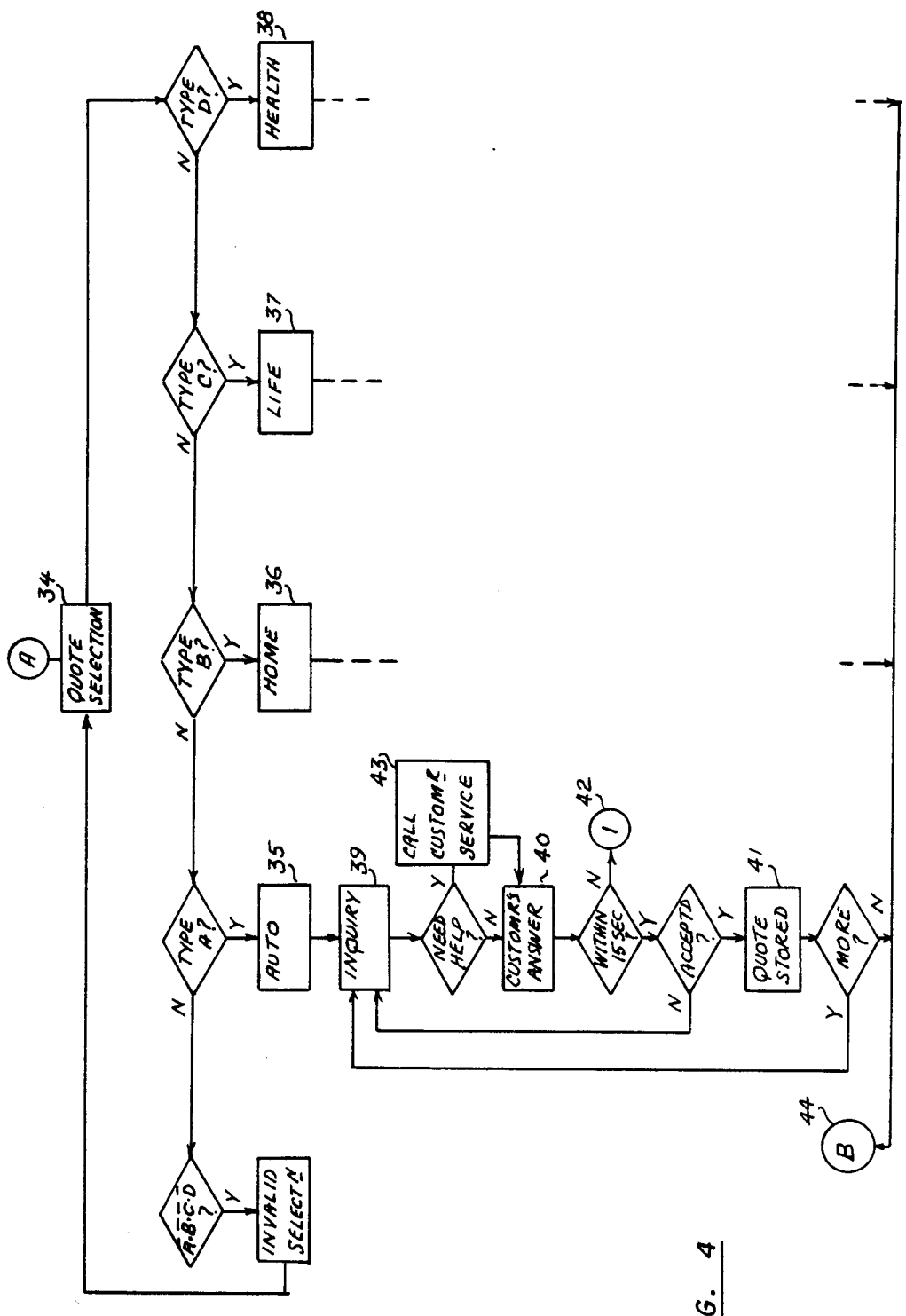
Figure 5:
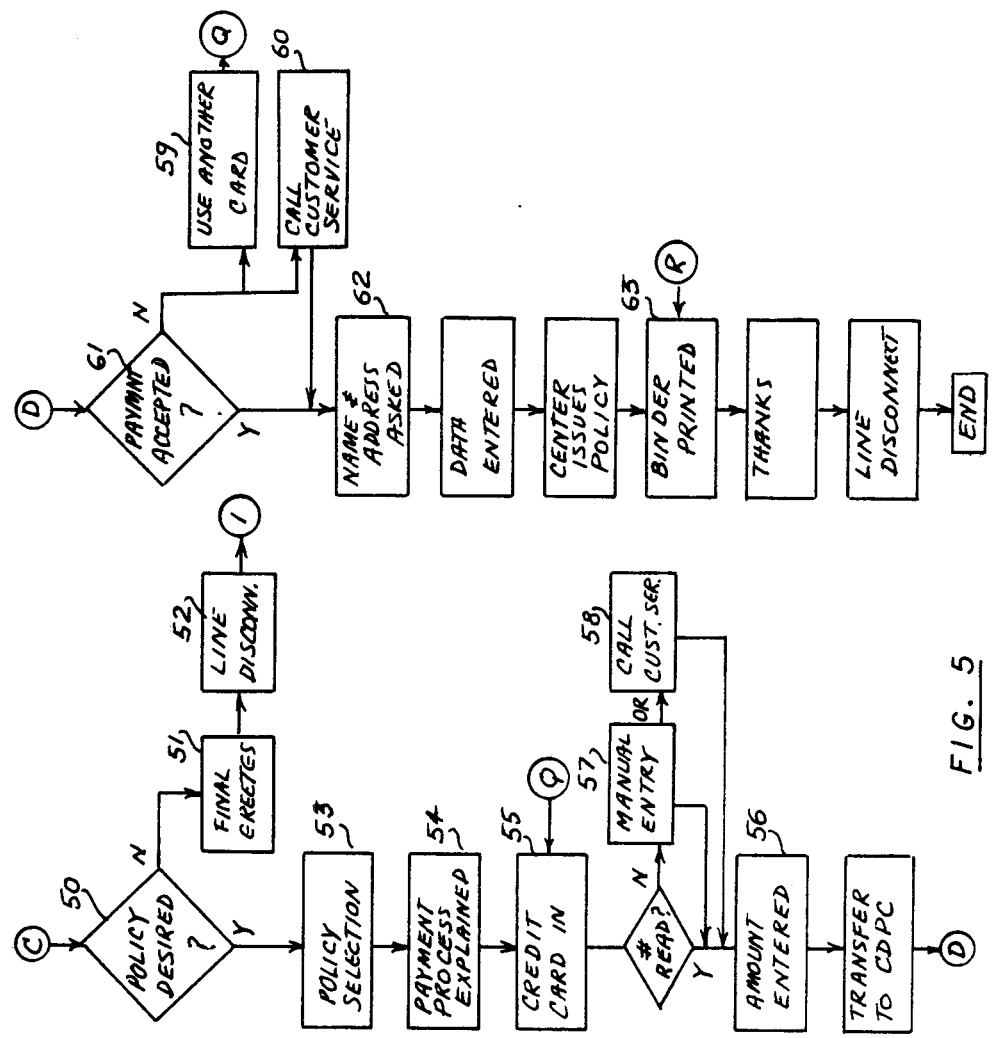
Figure 5:
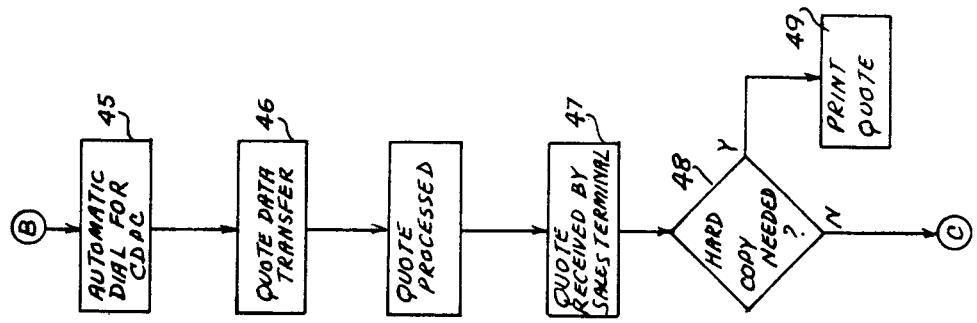
Figure 6:
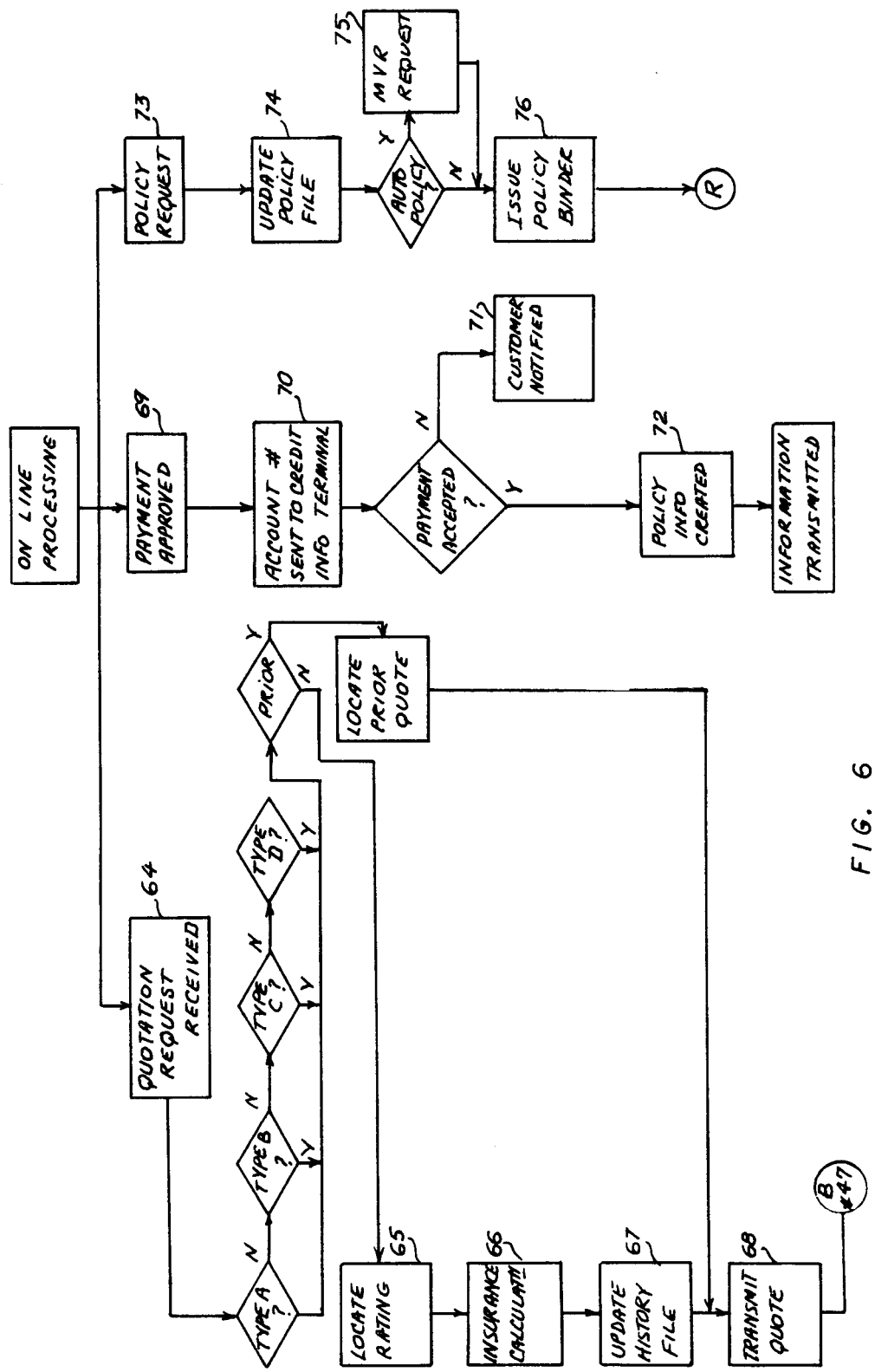
Figure 7:
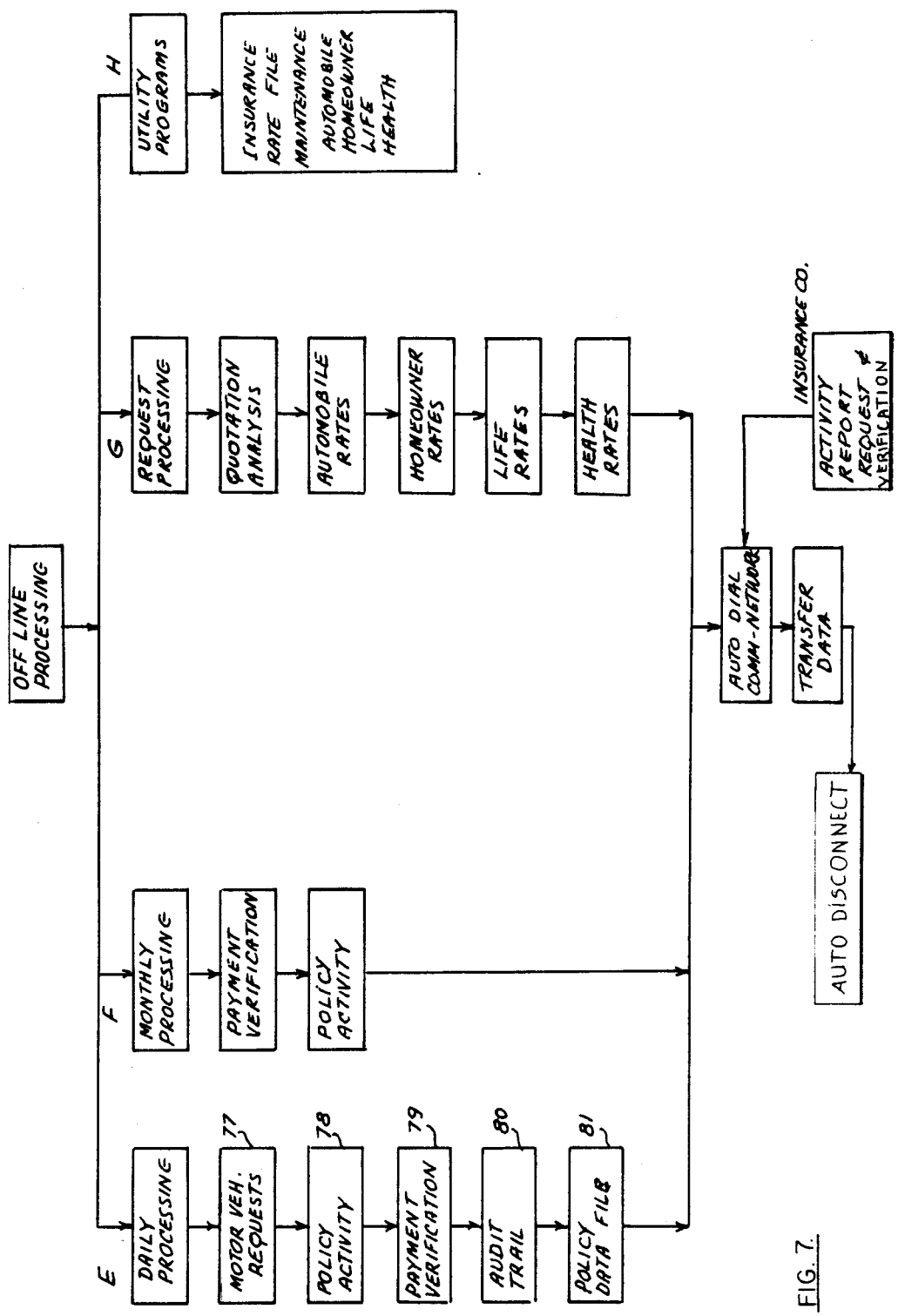

The various programs for carrying out the operations of the terminal processing units 10 and 14, and the central data processing center computer 22 are of a "menutype" and can best be understood with reference to the flow diagrams of FIGS. 3 to 7. FIGS. 3, 4 and 5 show the sequence of operations carried out at the sales terminals 2 and FIGS. 6 and 7 show the operations carried out by the central data processing center computer 22, either in response to input from one of the terminals or at predetermined time intervals.

The sequence of operations basically comprises the following steps:

(1) Terminal awaits detection of a customer;
(2) Terminal detects customer;
(3) Information gathering message played;
(4) Customer enters necessary information and selects information/services desired;
(5) Information relayed to central data processing center;
(6) Central data processing center performs insurance quote calculations, up-dates a quote file, and relays the information back to the terminal;
(7) Information given to customer on monitor screen and/or print-out;
(8) Customer asked if he/she wishes to make a purchase;
(9) If customer wishes to purchase insurance, credit card information is taken and relayed to the central data processing center;
(10) The central data processing center accesses the credit information terminal for credit approval or disapproval;
(11) If credit is approved, the order is taken and a policy is issued to the customer at the terminal;
(12) The central data processing center stores the information on the policy sold;
(13) At the end of every day, the central data processing center transmits information on the daily quote and sales activity for each insurance company to the appropriate files of the Telenet ® computer;
(14) The information for each company can be accessed from its terminal linked to the Telenet ® computer. At the same time, the insurance company can transmit up-dates on prices and policies to the system account at the Telenet ® computer.

These steps will now be described in more detail with reference to FIGS. 3 to 7.

Referring now to FIG. 3, each terminal will initially be in a ready state 24 awaiting detection of a customer. When a customer enters a terminal, the processing unit 14 is activated 25 by the photo-sensor device 17, and sends a signal to the processing unit 10 of the video subsystem to begin playback of the sales presentation.

The presentation begins at 26 by asking the customer to select a language (e.g. English or Spanish). If no language is selected (27), the question is repeated. On selection of a language (28 or 29), the presentation continues in the selected language.

The customer is first asked if he or she has received a previous quotation from the system (30). If the answer is yes, the quotation is recalled in a series of steps 31 to 33 from the central data processing center. If the answer is no, the questioning continues.

As seen in FIG. 4, the customer is asked (34) to select the type of insurance quotation desired (e.g. automobile 35, homeowner 36, life 37 or health 38). When the type of insurance is selected, a series of pertinent questions (39) for that type of insurance is asked, such as age, gender, marital status, and so on. The customer enters responses (40) on the touch pad, and the responses are shown on the monitor screen and repeated by the voice synthesizer for customer verification. Each valid answer is stored (41) until all necessary information has been gathered. If at any stage, no answer is received (42) within a predetermined time limit (e.g. about 15 seconds), the program assumes that the customer has left the terminal and returns to the ready state 24 to wait for the next customer.

If the customer has any problems in operating the system, he or she can pick up the telephone, activating the telephone sensor 18 to cause the processing unit 14 to auto-dial the central data processing center 1 (see 43). In response to the telephone sensor input, the central data processing center captures any entered data and helps the customer complete the necessary information.

Once all the necessary information has been gathered at the terminal (see 44), the processing unit 14 auto-dials the central data processing center 1 (see 45, FIG. 5), sends the gathered information to the center (46) and waits to receive an insurance quotation from each participating company. The central data processing center performs the desired quote, as will be described in connection with FIG. 6 below, and sends the quote back to the terminal.

On receipt of the quotation (47), the customer is asked if he/she wants a printed copy (48). If the customer answers yes, a printout is made at printer unit 20 (49). The customer is then asked if he/she wishes to purchase an insurance policy (50). If the answer is no, the customer is thanked (51); the dial-up line to the central data processing center is disconnected (52), and the terminal returns to the ready state 24 to wait for the next customer. If the answer is yes, the customer is asked to select the insurance coverage and insurance company desired (53).

The payment verification process is then explained to the customer (54). The customer is asked to insert a credit card into the magnetic strip reader 19 (55). If the reader 19 is able to read the account number properly, the customer is asked to select a payment amount (56). If the card reader 19 is unable to read the account number, the customer may enter the number manually on the touch pad (57) or the central data processing center customer service may be called for assistance (58).

Once the credit card information has been obtained, it is sent to the central data processing center where a payment verification procedure is initiated, as will be described in more detail below in connection with FIG. 6. The procedure results in either rejection or acceptance of payment, and corresponding data is transmitted from the data processing center to the terminal.

If payment is rejected, the customer can either insert another credit card (59) or call customer service for assistance (60).

If payment is accepted (61), the customer is asked to enter his or her name and address for billing purposes (62). The policy information collected at steps 53 and 62 is transmitted to the central data processing center. A binder policy issuance sequence is initiated at the center, as described in connection with FIG. 6 below. The binder policy information is then sent from the central data processing center back to the terminal, where the policy is printed out (63). The customer is then thanked, the dial-up line to the processing center 1 is disconnected, and the terminal returns to the ready state 24 to await the next customer.

The sequence of operations carried out by the central data processing center 1 in performing quotation calculations, carrying out credit checks, and issuing binder policies, will now be described with reference to the flow diagram parts, shown in FIG. 6.

When the central data processing center receives a quotation request (64) from one of the sales and information terminals 2, it first determines the type of quote requested. The center then locates the appropriate rating information (65) for that type of insurance from the memory, and makes an insurance calculation (66) for each of a series of different insurance companies based on the information received from the customer. A quotation history file stored in the memory is up-dated (67), and the quotation is sent to the terminal (68).

On receipt of a payment verification request (69) from a terminal, the processing center transmits the account number to the credit information terminal 3 (70). The results of the verification process are received by the processing center and relayed to the terminal. If payment is rejected, the customer is notified at the terminal (71). If payment is accepted, a policy information record (72) is created at the central data processing center and the customer is notified at the terminal.

When the central data processing center receives a request (73) to issue a policy from the terminal, the policy information file is up-dated with the name and address of the customer (74). If an automobile insurance policy has been requested, a Motor Vehicle Request (75) is generated automatically. The binder policy data (76) is sent to the terminal for issuing the policy to the customer.

The central data processing center 1 performs a number of programmed off-line operations at periodic intervals, as illustrated by the flow diagram in FIG. 7. The quotation and policy information files stored in the memory are up-dated daily. Additionally, a motor vehicle request file is stored and up-dated daily.

Every evening, a daily processing job stream E is run. This includes loading motor vehicle requests from a service bureau (77), and creating various daily reports. The daily reports include a policy activity report (78) listing all policies for that particular day's processing, a payment verification report (79) listing all payments verified by company number sequence, and quotation report (80) listing all quotations for a particular company by terminal and by insurance type.

A policy data file (81) is created for all policies issued for each company in that particular day's processing. This file is sent to the appropriate insurance company computer terminal 4 via Telenet ® to be input to their automated billing system. The central data processing center dials a central computer such as the Telenet ® computer 5 to which all the insurance company terminals are linked, logs on to the appropriate account for each company, and transmits the appropriate daily reports and policy data file to each company's specific Telenet ® account. The insurance company can then retrieve the information in its account prior to the next day's business by dialing the Telenet ® computer from its own computer terminal 4.

A monthly processing program F is run at the end of every month, including a payment verification report listing all payments verified for a given company during that month and a policy activity report listing all policies issued for a given company for a particular month. These reports are transmitted to the relevant account numbers of the Telenet ® computer for subsequent retrieval by the respective companies, and for the daily reports.

Data requests G can also be made by the individual insurance companies via their terminals 4 and the Telenet ® computer. When an insurance company wants a certain program to be run, a memo is sent from that company's terminal to the specific Telenet ® account number for the central data processing center, stating which report is to be processed. The reports G which can be requested in this way are the quotation analysis report, and rate reports for each type of insurance of a particular company. The rate reports allow each company to up-date its rates in the system as necessary. The quotation analysis report gives listings by company, insurance type and sales terminal; by company, sales terminal, date and time; and by company, sales terminal, age and sex. Thus insurance companies can analyze the areas where more quotes are being requested.

The requested reports will be sent from the central processing center to the particular company's Telenet ® account for later retrieval by the company.

Programs H are provided for keeping insurance rates stored by the central data processing center up to date. The rates are up-dated by checking the rate files for each type of insurance offered by each company.

The system of this invention allows a customer quick and easy access to insurance quotations from several companies, and allows the customer to make a selection and purchase insurance on a self-service basis. All the necessary operations of obtaining information, checking credit, transmitting information to the respective companies and issuing policies, are carried out automatically. This results in considerable savings in time and money for the customer and companies alike and will potentially result in more sales since self-service terminals may be established in many more areas than would normally be serviced by insurance offices and representatives.

It is likely that many members of the public will be more willing to purchase insurance when they can obtain and compare quotations so easily, without any sales pressure. Insurance companies should make significant savings on overhead costs.

It will be clear that this system may be applied to many other types of customer service and sales industries. Some examples are the travel industry, many types of financial services, and catalogue sales industries.

It will be clear that modifications can be made to the disclosed embodiment without departing from the scope of the invention. The scope of the invention is therefore not limited to the disclosed embodiment but is defined by the appended claims.

What is claimed is:

1. A system for automatically dispensing information, goods, and services for a plurality of institutions in a particular industry, comprising:

a central data processing center including means for storing service and price rate information for each institution and customer sales information;

at least one customer sales and information terminal including means for dispensing information and services to a customer and means for remotely linking said terminal to said central data processing center and for transmitting data back and forth between said data processing center and terminal; and a data processing terminal associated with each institution and means for remotely linking each terminal to said central data processing center comprising means for transmitting information back and forth between said data processing terminal and said central data processing center, each data processing terminal including means for storing institution service and price rate information and customer sales information, and input means for user input of up-dated service and price rate information;

said sales and information terminal including:
audio-visual means for interaction with a customer, comprising:
means for storing a sequence of audio and video information to be selectively transmitted to a customer;
means for transmitting a selected sequence of said stored information to the customer;
customer operated input means for gathering information from a customer and for accepting customer orders for goods and services; and
means for controlling said storing and transmitting means in response to customer input to transmit a selected sequence of information to the customer;

said sales terminal further including:
means for storing information and orders input by a customer;
means for transmitting said information and customer orders via said remote linking means to said central data processing center;
means for receiving data comprising customer selected information and processed customer orders for services from said data processing center via said linking means;
means responsive to said data receiving means for dispensing information and services to the customer;
and means for directing the operation of said audio visual means, data receiving and transmitting means, and dispensing means comprising means for holding an operational sequencing list and means responsive to the status of the various means for controlling their operation;

said central data processing center including:
means responsive to data received from said sales terminal for transmitting selected stored information to said terminal via said linking means;
means responsive to a customer sales order from said sales terminal for up-dating said sales information in said storage means, and transmitting said order to said terminal via said linking means for dispensing of the ordered services;
means for periodically accessing said institution terminals via said linking means for transmitting customer sales information for each institution to its associated terminal, and means for periodically accessing said institution linking means for collecting and storing service and price rate information from each institution terminal.

2. The system of claim 1, further including a credit information terminal remotely linked to said central data processing center, said sales terminal including means responsive to a customer order for collecting credit information from the customer and transmitting said credit information to said central data processing center, and said central data processing center including means responsive to said credit information for accessing said credit information check based on said credit information, and transmitting the results of said check to said terminal sales and information.

3. The system of claim 2, wherein said credit information collecting means comprises a magnetic strip reader.

4. The system of claim 1, including
a plurality of self-service sales and information terminals at a series of remote locations; and
means for remotely linking each sales and information terminal to said central data processing center for transmitting data back and forth between said terminals and said central data processing center.

5. The system of claim 1, wherein an indirect link is provided between said central data processing center and said institution data processing terminals, said indirect link comprising a remote computer having storage means for storing a series of accounts corresponding to said central data processing center and each institution, and means for remotely accessing said accounts from said central data processing center and said institution data processing terminals for transmitting information to said accounts and receiving information from said accounts.

6. The system of claim 1, wherein said audio visual means includes a cathode ray tube display unit comprising a touch screen and said input means comprises a touch pad provided on said screen.

7. The system of claim 1, wherein said means for dispensing information, goods and services to said customer includes a printer unit.

8. The system of claim 1, comprising a system for automatically dispensing insurance quotations and policies from a plurality of insurance companies, wherein said data processing terminals are each associated with a respective one of said insurance companies, said data processing terminal storing means comprising means for storing insurance service and price rate information, said central data processing center including means for performing insurance quotation calculations on the basis of said stored information and customer information received from a sales terminal; and said sales and information terminal dispensing means comprising means for dispensing insurance quotation information and insurance policies.

* * * * *